Figure 1:
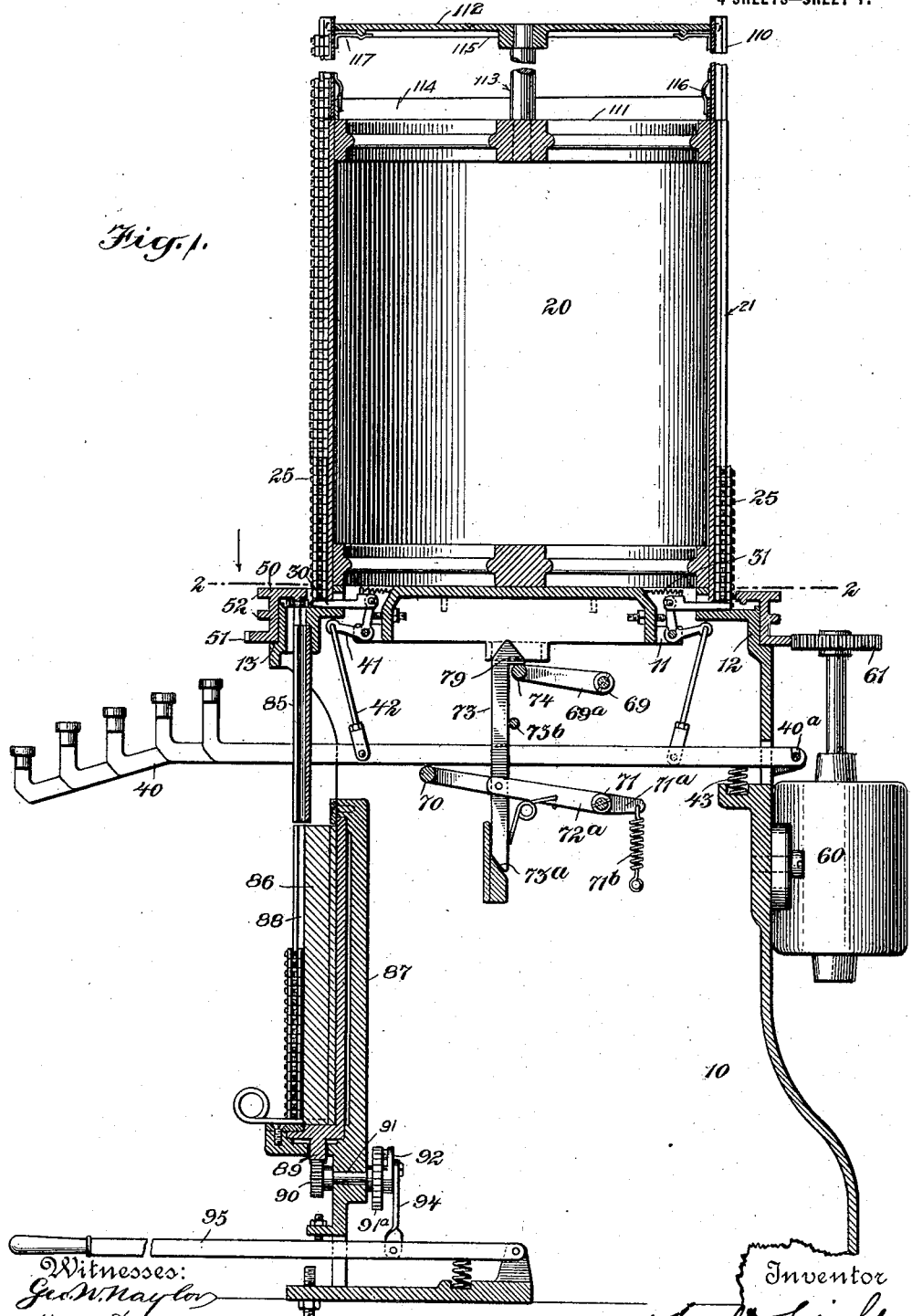

W. WRIGHT.
TYPE SETTING MACHINE.
APPLICATION FILED MAY 25, 1911.

1,203,679.

Patented Nov. 7, 1916.
4 SHEETS—SHEET 3.

Witnesses:
Geo. W. Naylor
Harry Deming

Inventor
Walter Wright

W. WRIGHT.
TYPE SETTING MACHINE.
APPLICATION FILED MAY 25, 1911.
1,203,679.
Patented Nov. 7, 1916.
4 SHEETS—SHEET 4.
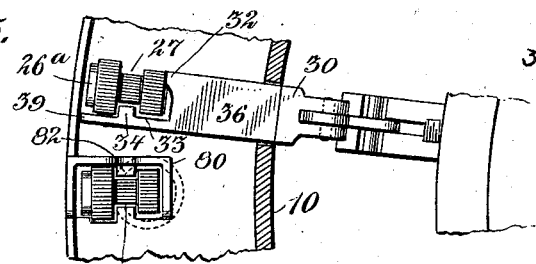
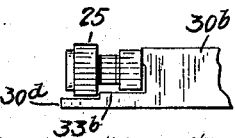
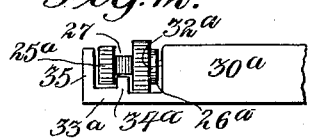
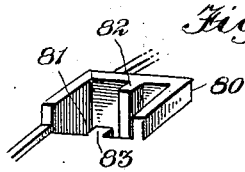
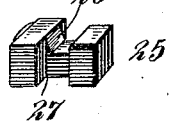
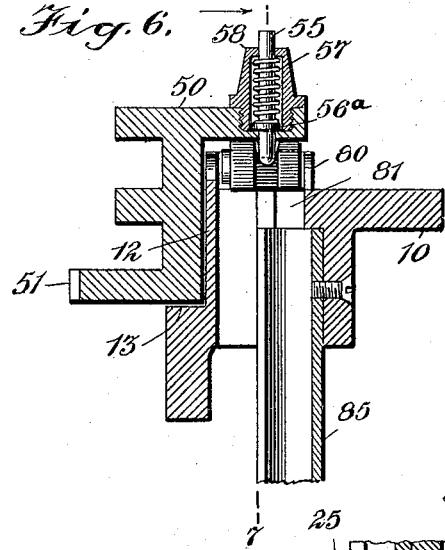
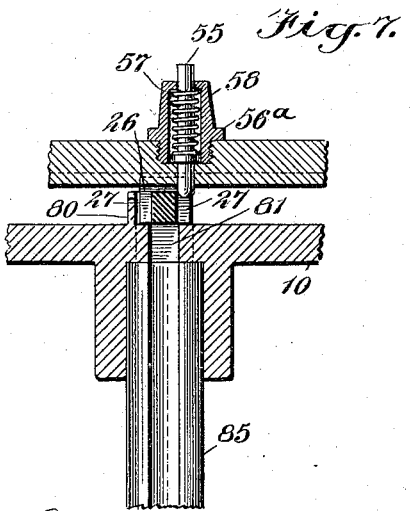
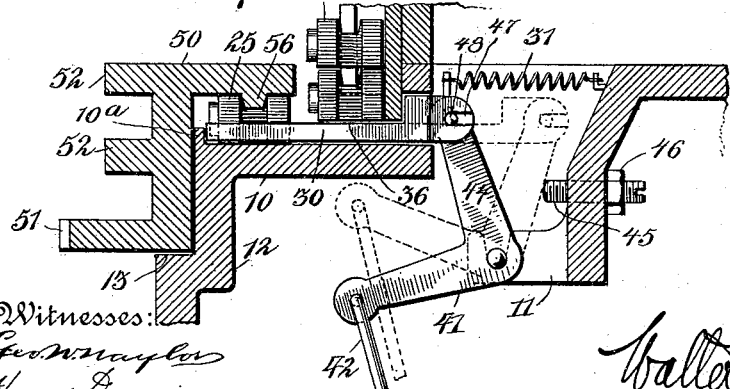

UNITED STATES PATENT OFFICE.

WALTER WRIGHT, OF NEW YORK, N. Y.

TYPE-SETTING MACHINE.

1,203,679.  Specification of Letters Patent.  Patented Nov. 7, 1916.

Application filed May 25, 1911. Serial No. 629,394.

*To all whom it may concern:*

Be it known that I, WALTER WRIGHT, a citizen of the United States, and a resident of the city of New York, borough of Manhattan, in the county and State of New York, have invented certain Improvements in Type-Setting Machines, of which the following is a specification.

A main object of the invention is to provide a machine by means of which type may be composed with great rapidity and which is particularly adapted for use in connection with type and ribbon office printing machines, in the production of fac-simile typewritten letters.

It is of prime importance, in employing large lists of names for the mailing of duplicate letters, that the setting up of the type for the letter be accomplished with despatch.

By my improved machine, long letters, briefs, and other work, may be speedily set up in typewriter-type-faced metal type. The invention however, is not limited to the type and work mentioned but is adapted for all work where standard type setting and similar machines are now employed.

My improved mechanism functions with accuracy to select and assemble the type in instant response to the movements of any approved arrangement of keys representing the respective characters to be set up for printing.

The rapidity of operation is attained by making provision for giving to the type a minimum of definite transfer movements over a surface of unbroken continuity from the supply to the point of assemblage and effecting the said movements by operative elements that keep the moving type under perfect control; this makes it possible to speed the driven elements to the utmost without any risk of lessening the precision with which they perform their respective operations.

The constructional form of the illustrated embodiment of my invention is designed for adapting it more particularly to a type supply in the form of a cylindrical magazine having the type representing the different printing characters in separate columns, which desirably are vertical. It is to be understood, however, that the invention is not limited to machines employing a magazine of the described character.

The type are disposed flatwise in the magazine and the latter is so arranged relatively to the supporting structure, that a bed is provided which affords a flat surface on which the lowermost type in each column directly rests. Ejectors give radial movement to the type in a straight direction on the flat supporting surface, and the ejectors are so formed as to maintain the type under perfect control and positively confine their movement to direct lines away from the respective magazine columns. The ejectors serve to move the type directly into position to be taken along the supporting surface by a highly speeded advancing or conveying means and a novel controlling and guiding member moving in a definite path, which path in the present instance, advantageously is circumjacent to the base of the cylindrical magazine. Located in the line of travel of the advancing means, the bed surface is formed with a common outlet for the type, conforming preferably to the profile of the type, and at the far side of the outlet opening is a positive barrier against which the successive types are brought to an abrupt stop. The conveying means include yielding elements that act as followers, and which ride over the abruptly arrested type at high speed without damage thereto, and in the act of riding over an arrested type, the follower positively and unfailingly presses downward on the type to forcibly eject it through the outlet opening in the bed, to any approved assembling device.

The mentioned guiding and controlling means for the type being conveyed, is in the form of a traveler, which is of ring shape to conform to the cylindrical magazine; and said ring traveler is mounted for limited vertical movement as hereinafter explained, for affording ready entrance of a type therebeneath. The traveler is provided with a rib which engages in a special groove or recess in the opposed side of the type, and after a type has entered beneath the traveler, upon the latter being raised, the traveler is caused to instantly close on the type, the mentioned rib being so accommodated in the corresponding groove of the type that the traveler continues its uninterrupted movement at high speed; the type however, is held by the ejector against movement until struck by the mentioned yielding elements, preferably spring pressed vertical pins, that take the type to the described outlet, there being desirably, a plurality of said pins to insure a quick movement of the successive types. As the type guiding and controlling traveler traverses a common path with the pusher pins, I utilize said traveler to mount the said pins so that the traveler in this form is made to constitute part of the conveying or advancing means and all will move in perfect unison. The arrangement is such that when a key is struck a corresponding type will be ejected, the traveler will be slightly raised from its seat to permit entrance of the type and then lowered, the type carried to the outlet leading to the chase or other desired point of assemblage and forced through said outlet and the ejector and key be quickly restored to their original positions.

Reference is to be had to the accompanying drawings in which—

Figure 2:
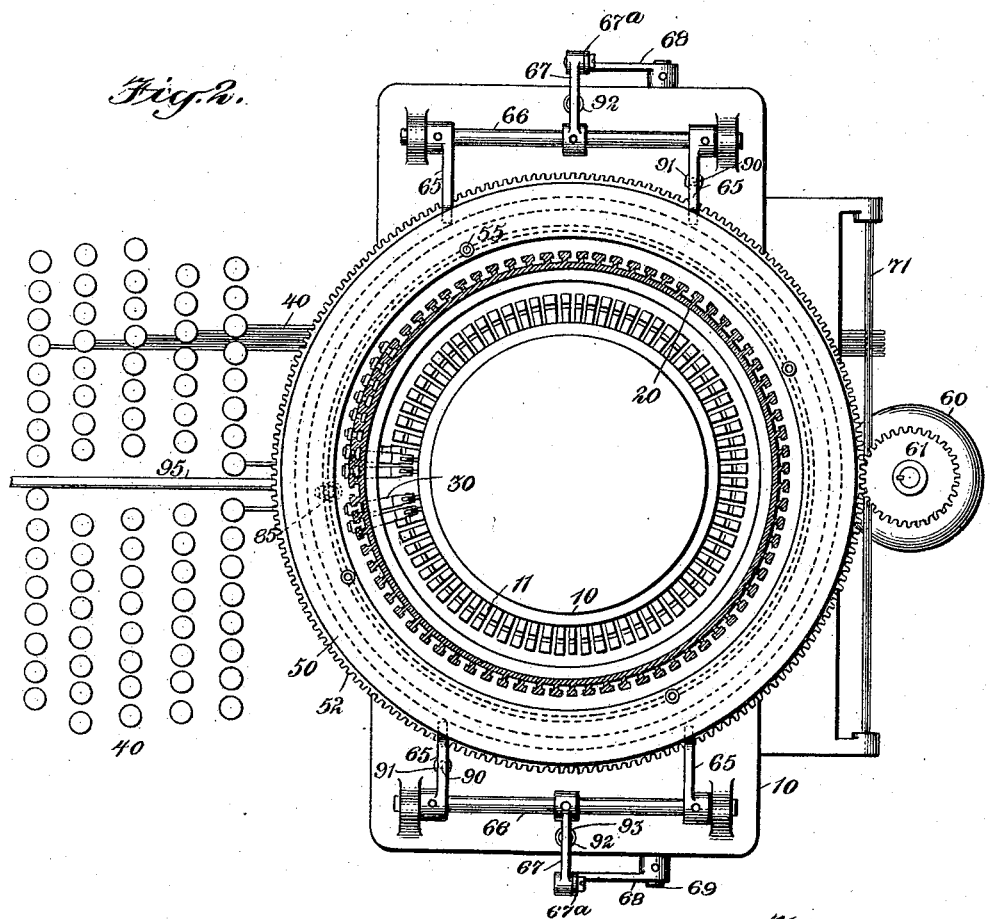
Figure 3:
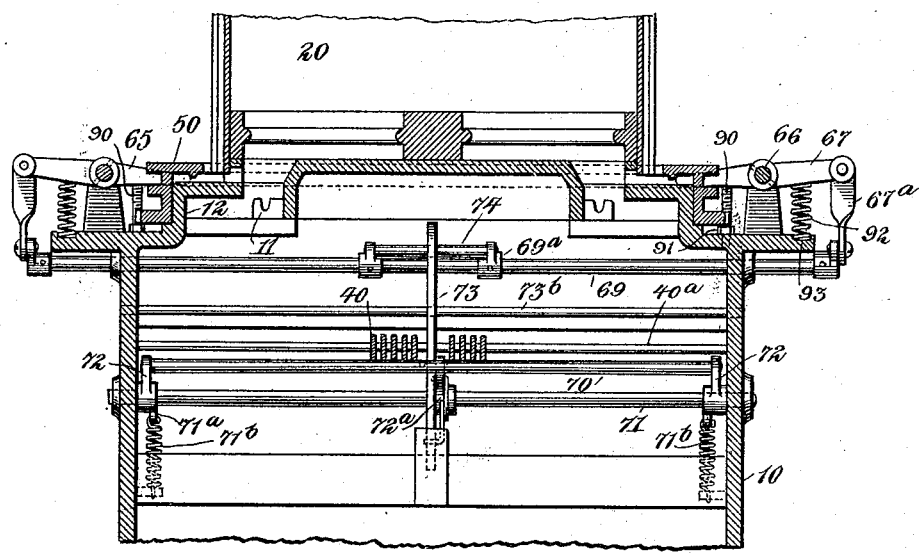
Figure 9:
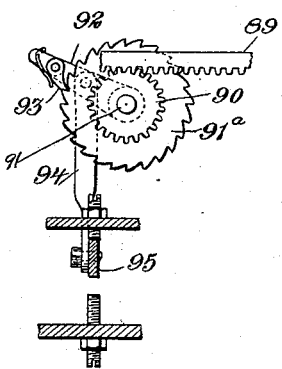

Figure 1 is a view in vertical section, of a machine illustrating one embodiment of my invention, parts being omitted when constituting mere duplications of those shown in the view; Fig. 2 is a partial sectional plan view on line 2, 2, Fig. 1, the individual ejecting devices being in large part omitted as unnecessary for the illustration, and the bank of keys being largely diagrammatic; Fig. 3 is a fragmentary sectional elevation taken at right angles to Fig. 1; Fig. 4 is a fragmentary view in vertical section of certain details of the means for raising the traveler to permit entrance of a type therebeneath after the type is ejected from the magazine; Fig. 5 is a detail sectional plan view of an ejector and a part of the supporting platform or bed over which the high speed traveler moves, the view indicating the escape outlet for the type and the stop at said outlet for arresting the type, two types being shown respectively in the position given to the same when ejected from the magazine and in the position of escaping through the bed; Fig. 5ª is a detail perspective view showing the stop for arresting the successive type and releasing them from the carrier and showing the shape of the outlet opening for the type; Fig. 6 is a detail view in vertical section showing one of the pusher pins of the carrier for engaging the ejected type; Fig. 7 is a detail in vertical section on line 7, 7, Fig. 6; Fig. 8 is a detail in vertical section showing an ejector in the outer position; Fig. 9 is a detail side elevation of a means for laterally shifting the chase to bring a different grooved portion in position to receive the type; Fig. 10 is a perspective view of the improved type, which has the usual side grooves or recesses that give the type guided movement in the channels of the magazine, and has in addition a special groove which receives the guiding rib on the traveler; Fig. 11 is a detail view in vertical section, given to illustrate a form of traveler which is bedded on a movable member, ordinarily of annular form, instead of being directly bedded on a fixed frame part and directly lifted as in the form illustrated in the other figures; and Fig. 12 represents another form of the ejector. Fig. 13, represents still another form of ejector.

Referring more specifically to the mechanical features of the illustrated example of my invention, a suitable frame or base 10 mounts a magazine 20 of any approved detail construction, having vertical channels 21 for holding a supply of type 25 in columns representing various printing characters, the lowermost type resting directly on the flat surface of the base. Ejectors 30 have suitable connection with the keys 40 as by bell cranks 41 fulcrumed on grooved radial brackets 11 of frame 10, and by pull rods 42, the return movement of an ejector being influenced by retractile spring 31 and the keys being restored by a compression spring 43 (Fig. 1) or by other approved means.

The ejectors are assembled preferably interiorly of the magazine type columns and move outward to deliver the type beneath the traveler 50 which is made annular to conform to the cylindrical magazine. Said traveler, in the form shown in Figs. 1 to 9, surrounds snugly the circular portion 12 on frame 10 and its lower edge may bed on a ledge or shoulder 13 on the frame. Provision is made for driving the traveler continuously at a high rate of speed by suitable driving means; an electric motor 60 is illustrated, having a spur gear 61 in mesh with cog teeth 51 on the base of the traveler. To raise the traveler slightly to permit entrance of an ejected type therebeneath, suitable lifting devices are provided, which in the present example, constitute essentially levers of the first order, desirably located at diametrically opposite points of the carrier; thus at opposite sides of the traveler, lifting arms 65 (Figs. 2, 3 and 4) extend from rock shafts 66 to the traveler and terminate between flanges 52 thereon, and rock arms 67 on each shaft 66, connect by links 67ª with crank arms 68, provided on the ends of a rock shaft 69 which ranges across the frame 10 below the ejectors. Motion may be imparted to shaft 69 to raise traveler 50 as follows: Below the keys 40 a universal bar 70 is supported, the keys being fulcrumed rearward of the bar 70 on a rod 40ª common to all, and the said universal bar is supported from a rock shaft 71 by arms 72. On a third arm 72ª on shaft 71 is suported an upright pawl 73 pivoted at about the center and engaging by its hooked upper end, a lever bar 74 which is supported on rock shaft 69 by arms 69ª. By the described connections between the keys and the lifting arms 65, the depression of a key depresses universal bar 70, and rocks the shaft 71, which in turn pulls down pawl 73 thereby rocking shaft 69, which through arms 68 and links 67ª pull downward on rock arms 67, and thus through shaft 66 cause the lifting arms 65 to raise the traveler. In the continued downward movement of the pawl 73, its lower end strikes an oblique cam surface on a member 73ª and the pawl thus cams off and releases the bar 74 to permit the traveler to be dropped. Shaft 71 has side arms 71ª connected with retractile springs 71ᵇ, whereby the said shaft, the pawl 73 and the universal bar 70 are restored to position. A bar 73ᵇ guides the vertical movements of the pawl.

Properly timed with the raising of the traveler is the movement of the ejector 30 corresponding to the key struck, and when the type reaches the limit of its radial movement, the traveler drops and an annular depending rib 56 thereon, having a cam-like angular face (Fig. 4) is received in a transverse groove or recess 26 formed across that side of the type that is uppermost in the magazine as well as while in transit toward the point of discharge. This rib 56 is herein also referred to as a type-key. It will be observed that the groove 26 is not to be confounded with the oppositely disposed grooves 27 in the type for receiving the sides of the channels 26 of the magazine. To convey the successive types to the point of discharge as rapidly as they are ejected, at least one type pusher 55 is provided, preferably two or three of said pushers being employed in practice. The traveler 50 conveniently serves to mount the pushers and each pusher is very advantageously in the form of a vertical pin having a collar or flange 56ª pressed against by a compression spring 57 in the housing 58. The housing may be detachably secured to the traveler as indicated, by screw threads or equivalent means with a view to the convenient replacing of a pin when worn. The pin is beveled to cause it to be readily forced upward when the type strikes the arresting device 80 provided at the outlet opening 81 formed in the path of travel of the type and its forward movement is abruptly stopped. The outlet opening conforms to the shape of the type lying flat and is only sufficiently larger than the type to permit the type to pass freely therethrough. The arresting device 80 may be in the form of a flange its walls rising at three sides of the outlet opening, two of which act as wing guides between which the type enters, and at the far side of the opening the transversely ranging portion of the flange, has a lug or fixed key 82 conforming approximately to one of the side recesses 27 of the type, a second lug 83 being produced on the flat bed on which the type is carried, said lug 83 completing the conformation of the walls defining the opening in correspondence with the flat-lying type. The pusher pin when the type is brought up against stop 80, will yieldingly ride over the type and force the type through the outlet opening in a downward direction.

It will be seen from Figs. 5, 6 and 8 that the ejector 30 also has at its forward end a conformation corresponding in essentials with the adjacent side of the type, the ejector being formed with a transverse pusher surface 32 (Fig. 5) for contact with the opposed surface of the type, and with an outward extension 33 having a lateral enlargement or lug 34 to enter the adjacent side groove 27, the ejector thus being efficient in holding the type in correct position to drop or be fed through the outlet 80 when carried to the latter and preventing any twisting or displacement of said type when struck by a pusher 55.

Below the outlet 80, I have shown a vertical guide tube 85 below which is a chase or other assembling device 86, the chase being mounted to slide laterally in a vertical support 87, and having channels 88 either of which may be made to aline with the guide tube 85. To provide for shifting the chase the latter has a rack 89 meshing with spur pinion 90 on a shaft 91 on the support 87, and on said shaft also is a ratchet wheel 91ª and a pivoted arm 92 carrying a pawl 93 engaging said ratchet wheel. The pivoted arm 92 is connected by link 94 with a hand lever 95 so that the throwing of the lever serves to shift the chase to bring its channels in succession into alinement with the type guide 85.

In the form shown in Fig. 11, instead of the traveler 50ª being directly bedded on the machine frame, it is bedded on a separate ring 100 which has an annular groove 101 in its perimeter for receiving the described lifting arms 65. The carrier may be driven by a round belt 102 and it desirably runs on ball bearings 103. Similarly ball bearings 104 may be interposed between the ring 100 and the outer surface of the annular part 12 of the machine frame. The ring 100 does not rotate but has only a vertical movement permitted by the lifting arms 65, the balls 104 moving in grooves 105. By this construction it will be seen that the ring traveler 50ᵃ is free from the direct action of the lifting arms and may have a belt drive which arrangement reduces noise.

In Fig. 12 is illustrated an ejector having features additional to those in the form shown in the other figures the aim being to provide, if it be possible, an even greater assurance that the type will not be accidentally shifted from proper position in transit. Thus the ejector 30ᵃ in Fig. 12, has a transverse surface 32ᵃ for contact with the opposed surface of the type 25, an extension 33ᵃ to range along a side of the type, a terminal lateral pilot member 35 to embrace the farthermost end of the type, and an intermediate lateral member 34ᵃ to enter the adjacent recess 27 of the type. With this form of ejector, the type is designed to be moved from the magazine to the discharge outlet with the face of the type toward the pusher surface 32ᵃ, and this is feasible because when the type is engaged by the traveler, the proportion of the parts is such that there will be no damaging rubbing action against the type face when the conveying pusher pin forces the type from the ejector, as the principal rubbing action will be against the base end of the type. An advantage in the ejector directly pushing against the face of the type is the broad bearing thus afforded, which contributes to the safe movement of the type without danger of its being accidentally turned.

The member 34ᵃ may be omitted from the the form of ejector in Fig. 12, because the outer end serves the same purpose and has its own advantages in that it forms one side of a three-sided box or inclosure. With an ejector as described, a type is pressed outward by contact of the ejector with the face 26ᵃ of the type, and the rib 56 of the traveler drops into the groove 26 before the key is released; the release of the key permits retractile spring 31 to pull backward on the ejector, so that the member 35 presses against the base of the type while the type is held by the traveler. Thus the base of the type receives the rubbing action against the ejector, when the type is forced out by an advancing pusher pin.

It may be well to explain here that if a yielding pusher pin 55 should be encountered by an outwardly moving ejector, the said pin will rise in the traveler, the same as when riding over an arrested type at the outlet.

It will be observed (Figs. 5 and 8) that the ejector has a flat top surface at 36 just rearward of the type-engaging members, which surface is approximately co-extensive with the area of the flat lying type, and in the outward movement of the ejector, the surface 36 is brought under the columns, of type and forms a seat on which the type in the magazine columns will rest until the ejector again moves rearwardly to permit the lowermost type to drop into position to be engaged by the ejector on its next forward movement.

The connection between the upper arm 44 of the bell crank 41 and the ejector 30, is provided by forming the rear end of the ejector with a horizontal slot 47, which receives a cross pin 48 on said crank arm. The connection causes the bell crank to force the ejector outward and permits the crank to return to normal position with the key lever 40, under the pressure of spring 43, before the ejector returns under the action of spring 31, after the advanced type has been carried along by the advancing pusher 55. The return movement of the bell crank lever 41 is limited by a suitable device, in this instance, an adjusting screw 45 having a lock nut 46 (Fig. 8).

The machine may be adjusted for accommodating any size type, and to this end it is possible to so adjust the traveler that the ring 56 thereon will be very close to the bed, to engage even the smallest type. To make provision for limiting the downward movement toward the bed, the said traveler instead of resting on the bed, is preferably sustained on adjustable members. Thus I have shown upright stops 90, provided with lock nuts 91, beneath the arms 65, for limiting the downward movement of the said arms, the said stops being screwed into the frame 10, and when the stops are so adjusted as to prevent the traveler from seating on the machine bed, it is evident the arms 65 may sustain the traveler at a height to accommodate any type from say eight to sixteen points, or any other sizes within the capacity for which the parts are proportioned.

Compression springs 92 bear at their upper ends against the arms 67, and rest at their lower ends in recesses 93 in the frame 10 of the machine, and aid in forcing the ring 50 or 100, downward toward the base, the instant the pawl 73 is cammed off from its engagement with the bar 74.

A vertical flange 10ᵃ is provided on the frame 10; to limit the forward movement of the ejectors 30, the extreme forward ends of which extend slightly beyond the forward ends of the types to constitute a pilot member so that a type cannot be jammed by being carried outward beyond the point where the controlling rib 56 can properly enter the grooves 26 and position the type.

In Fig. 1, I show means appurtenant to the magazine for automatically feeding type into the type magazine while the machine is being operated at a very high rate of speed. As will readily be understood in operating a typesetting machine at the rate of 500 or more letters per minute, the vowels and letters most commonly used in ordinary words as well as the spacing blocks will be used in large quantities; therefore I provide means for using the machine continuously without intermission or stopping to replenish any of the type channels, by providing over the top of each type channel in the magazine, a removable type supply tube supported in such a manner that the type contained in said type supply tube will be automatically fed by gravity into the channel proper of the magazine, just as they automatically and by gravity leave the channels proper of the magazine in succession into the arms of the ejector. By this means it will readily be seen that as these supply tubes become empty, they can be replaced at convenience, at any time before the type in any particular channel in the magazine proper is entirely exhausted, and thus render the type feed continuous and automatic.

The removable type-holding tubes 110 are detachably supported in any suitable manner. In the illustration (Fig. 1) they are arranged in connection with substantially cylindrical frame or body comprising a lower spider 111 which fits friction tight in magazine 20, or is secured to the latter in any suitable manner, and a peripherally recessed top plate 112 which is supported from the said spider by a central spindle 113. The spider 111 has a vertical annular flange 114 located just inside of the channels 21 of magazine 20 and on its underside the top plate 112 is formed with an annular rib 115. The attachable and detachable tubes 110 have each on the inner side, a downwardly projecting hook 116 that is adapted to engage over the flange 114, and above the hook 116, each channel has an inwardly projecting spring arm 117, the curved end of which may spring into engagement with the rib 115. The attaching means shown for tubes 110 may be of any other suitable character.

In Fig. 13, is shown an ejector which can return with the bellcrank, and if desired may be made a part of same. As shown in this figure the ejector 30$^b$ is formed with a side extension or arm 33$^b$, reduced in width at the end portion to conform to the shape of the type, the head or front end of which is wider than its base or rear end; on the side of the ejector opposite to the arm is a raised seat 30$^d$ adapted to contact with the base of the type in pushing it forward and, by reason of the point of contact being to one side of the center of gravity of the type, it is given a turning or twisting thrust tending to keep the type-head against the arm as it is advanced.

Having thus described my invention, what I claim and desire to secure by Letters Patent is:

1. A type-setting machine comprising a type magazine having channels containing type lying flatwise, the said type having guide grooves in opposite sides in which the side walls of the magazine channels are received, and having a third groove across another side of the type, the said machine having a bed presenting a flat surface on which the lowermost types in the channels rest, a type assembling device, the said bed having an outlet extending downward therefrom and forming a throat leading to the assembling device, a barrier at said outlet forming a stop for the type, the said barrier and the opposite side wall of the outlet presenting members corresponding with the side recesses in the types, the mentioned flat surface of the bed extending around the magazine and on a plane with said outlet, key-operated ejectors having each a member received in one of the side recesses of said lowermost types, type-advancing means in the form of a yieldingly mounted pin traveling around the magazine and over the throat of the assembling device, the mentioned ejectors delivering the type into the path of travel of the said type-advancing means, and a vertically shiftable type-controlling device extending around the said path and having a member so positioned thereon as to enter the mentioned third groove in a type after the latter is moved outward by an ejector, connections between the keys and the type-controlled device to lift the latter, the yieldingly mounted pin having a riding movement over the barrier and over an arrested type and constituting a forcible ejector to discharge the type into the throat leading to the assembling device.

2. A type-setting machine comprising a type magazine, an annular traveler continuously revolving around the magazine in a fixed path, ejectors movable outwardly from the magazine below the path of said traveler, said ejecting means also constituting a means of control for the type until the latter is engaged by said traveler and means for raising said traveler coincident with ejecting the type.

3. A type-setting machine comprising a base having a discharge for type, a type magazine on said base, ejectors operable to eject type outwardly from the magazine, and type advancing means to which the ejectors deliver the type above the plane of type delivery, the ejectors being provided with type controlling means movable transversely in the path of said type advancing means.

4. A type-setting machine comprising a magazine for type, a base upon which the type rest, said base extending annularly beyond the magazine, radially disposed ejectors operable to eject type horizontally away from the magazine, and rotary type-conveying means traveling around the magazine, said base having an outlet conforming to the profile of the type and leading directly downward from the path traversed by said type-conveying means.

5. In a machine in which type is moved from one point to another, a stationary path along which the type travel, type-conveying means traveling over said path, type controlling means also traveling in said path and a type receiving throat in said path, said throat having walls conforming to the profile of the type.

6. In a machine in which type is moved from one point to another, a stationary path along which the type travel, said path being provided with an outlet leading directly downward, means for holding the type transversely of said path and type conveying means traveling over said path, said conveying means also including a member adapted to pass over the outlet and constituting an ejector to forcibly discharge a type into the outlet.

7. In a type-setting machine having a support for a magazine and an outlet in said support, means for transferring type from the magazine to the outlet, said transferring means including a controller member and a pusher member that travel over the outlet and a barrier at the far side of the outlet adapted to restrain the type without impeding either of the said members.

8. In a type-setting machine having a magazine, a type support therefor, a fixed path surrounding said support, having a type outlet means for positively transferring type from the support to the outlet, said transferring means including a yielding member that travels over the outlet, and means for arresting the type to permit escape thereof through said outlet.

9. In a type-setting machine, a support for a type magazine, type selecting means mounted adjacent to said support, the machine having on a fixed portion a surface onto which the selecting means deliver type, type advancing means traveling over the said surface in a path to receive type moved by the selecting means, and type-controlling means traveling in unison with the advancing means and confining the type in a predetermined position with respect to the advancing means.

10. In a machine a bed having an annular surface over which type is moved from one point in the machine to another, said surface being formed with an outlet leading directly downward therethrough, and a traveling means for advancing type over said surface and to the outlet, said traveling means including an ejector to engage a type and forcibly discharge the same through the outlet.

11. In a machine a surface over which type is moved from one point in the machine to another and having an outlet leading directly downward from said surface, a traveling means for advancing type over said surface and to the outlet, said traveling means including an ejector to engage a type and forcibly discharge the same through the outlet, in combination with means for delivering type to said traveling means.

12. In a type-setting machine, a bed surface having a type discharge opening therethrough, type selecting means delivering type to said surface, and a type-assembling device, in combination with a traveling means serving to advance the selected type over said surface and constituting an ejecting means for forcibly discharging the type through the opening formed in the said surface in the path traversed by the advancing means, the opening leading to the type assembling device, the surface over which the type is advanced accommodating the type so that it travels without turning until it escapes through the mentioned opening.

13. In a type-setting machine, type selecting mechanism and ejecting means, a type support adapted to receive ejected type, said support being provided with an outlet, type-advancing mechanism receiving the selected type, and an assembling device, the type outlet being located directly across the path over which the advancing means travels, and connections between said outlet and the assembling device, the said type advancing means rising to receive an ejected type coincident with a forward movement of the ejecting means.

14. In a type-setting machine, a type-selecting means, a type-advancing means that receives the selected type, a path upon which the selected type may be advanced and an assembling device having a receiving throat, the mouth thereof being located directly across the path over which the advancing means travels, the selecting means having type engaging portions movable with the ejected type below the path of the advancing means.

15. In a type-setting machine, a flat annular supporting surface over which type may travel and a support for a source of type supply, type selecting means delivering to said surface, type controlling means comprising a rigid ring movable to receive a type, and traveling in a definite path over said surface, and co-acting means for causing the type to take a discharging movement from the path of ring travel and through the said flat supporting surface.

16. In a type-setting machine, selecting mechanism successively selecting type from a source of supply, a positive type advancing means, said type advancing means traveling in a definite circular path below which the selected type are delivered at different points, the said advancing means having a speed that completes the advance movement of any received type in a less period of time than the shortest interval between the delivery of two successive types to the said path, to insure that an advancing type be discharged before a succeeding type can be received in the said path of advance.

17. A machine of the general character described comprising a magazine, a support therefor, a type-track surrounding said support, a continuously moving high speed type controlling traveler, a type-ejecting means serving to move types on the type-track and into the definite path traversed by the traveler, and a pusher element on the traveler for advancing a type along said type-track.

18. A machine of the character described comprising a magazine, a support therefor, a fixed track-way thereabout, means for advancing type from one point to another on said track-way, means for delivering type thereto, and means for shifting the type-advancing means for permitting movement of a type into the path traversed by the advancing means over said track-way.

19. In a type-setting machine, a bed presenting a flat surface forming a circular path, a type conveyer mounted to travel over and along said circular path, and being movable vertically with relation to said bed for receiving a type, means for actuating the said conveyer vertically and means for imparting rotary motion thereto.

20. In a type-setting machine, a fixed bed presenting a surface constituting a circular path, a type conveyer mounted to travel over and along said circular path for conveying type from one point thereon to another, means for actuating said type conveyer longitudinally of the path, and means for moving said conveyer transversely thereof for receiving a type.

21. In a machine a flat surface upon which type is moved from one point thereon to another, type advancing means mounted to travel continuously in a path embracing said points, and means for shifting said advancing means perpendicularly to the plane in which it travels, said advancing means including a controlling member accommodating a type therebeneath and presenting surfaces positively opposing movement of the type in a direction transverse to the path of travel.

22. In a type-setting machine, a surface over which type is moved from one point thereon to another, and an outlet leading directly downward through said surface, a rigid traveling means for advancing type on said surface to the outlet, and a member that exerts an ejecting pressure against the type at the outlet, said member being carried by the advancing means.

23. In a type-setting machine, a fixed definite annular path upon which type may be moved, an annularly traveling advancing means for conveying the type along said path, and means for shifting said advancing means perpendicularly to the plane of its normal travel whereby a type may be brought into operative engagement therewith.

24. In a type-setting machine, a rigid annularly traveling advancing means for conveying type, a fixed annular path on which type are moved, and type-delivering means for positively delivering the type to the said advancing means upon said fixed annular path.

25. A means for setting type, comprising a type track, a type supply in the form of a channeled magazine containing type having guide grooves in the opposite side edges to which the side walls of the channels are suited, the type furthermore having each a transverse groove formed in the flat side of the type and extending through both side edges of the type, selecting devices operable to eject from the magazine the type representing the different characters in the order in which they are to be composed, and type-advancing means including a member traveling with the said means fitting in the mentioned grooves in the type.

26. In a type-setting machine formed to receive a supply of type, type selecting mechanism in which is comprised ejectors having a type-engaging member and a pilot member extending beyond the type and having a horizontal outlet at one side.

27. In a type-setting machine a flat horizontal support, a cylindrical magazine thereon formed to receive a supply of type, type-selecting means comprising type-ejectors movable radially outward in a horizontal plane and means for actuating the type-ejectors, said means being pivoted and having a return movement independent of the type ejectors.

28. In a type-setting machine a flat horizontal support, a cylindrical magazine thereon formed to receive a supply of type, type selecting means comprising type-ejectors movable radially outward in a horizontal plane and means for actuating the said type-ejectors, said means being pivotally supported and having a return movement independent of the type-ejectors, in combination with separate retractile means for the type-ejectors.

29. In a type-setting machine, the combination with a magazine having type channels, of ejectors operable to eject the lowermost type of the channels, said ejectors having seat portions movable beneath the channels when the ejectors are actuated to eject a type, and having type receiving openings in advance of said seat portions, said openings having each a side outlet.

30. In a type-setting machine, having a magazine and a support therefor upon which type may be ejected, the combination of a traveling type advancing means, means for shifting said advancing means bodily to receive a type, type ejecting means, and keys serving to both actuate the ejectors and the said shifting means.

31. In a type-setting machine having a magazine and a support therefor, operable type ejectors having each a member for pushing a type endwise and a member to extend lengthwise of the type, the said ejectors being open-sided opposite the said lengthwise member.

32. In a type-setting machine having a magazine and a support therefor, type ejectors having each a box-like receiver to embrace a type on three sides, the fourth side being open and forming a lateral outlet.

33. In a type-setting machine having a source of supply, and a surface over which type may be moved from the source of supply to the point of delivery, the combination of type-ejecting means for moving the type on said surface from the point of supply, and a second means serving to further move the type moved by the ejecting means and advance the same over said surface, each of said means comprising a pusher member, to give the type a forward impulse, and a member to restrain the type against movement other than a forward one.

34. A machine of the general character described, having a type supply, type ejecting means, a surface upon which type may be moved, and a continuously traveling high speed type advancing means comprising a rigid type controlling member, and a type pusher device combined therewith.

35. In a machine in which type is to be moved from one point in the machine to another, a part forming an endless stationary type race on the surface of which type may travel, and type advancing means traveling at high speed above and out of contact with the surface of said type race.

36. In a machine a surface on which type are to be moved from one point to another, rotary type advancing means traveling between said points, in combination with type ejectors constituting type holding means until the type is engaged by the advancing means.

37. In a type-setting machine, the combination of a series of ejectors, a part having a surface forming an arcuate path over which an ejected type may travel and onto which surface the ejectors deliver the type, and a high speed continuously revolving advancing means having a member constituting a pusher, traveling over said surface at intervals of high frequency, on a line transecting the line occupied by the type when ejected.

38. In a type-setting machine, the combination of a series of ejectors, a part having a surface constituting a path on which an ejected type may travel, and onto which surface the ejectors deliver the type, a high speed revolving advancing means having a pusher member traveling over said surface at intervals of high frequency on a line transecting the line occupied by the type when ejected, said revolving and advancing means including a type-controlling device receiving the ejected type and holding the same against turning.

39. In a type-setting machine, the combination of a plurality of ejectors, a part having a surface forming an arcuate path on which an ejected type may travel, and onto which surface the ejectors deliver the type, a high speed continuously revolving advancing means having a pusher member traveling over said surface at intervals of high frequency, on a line transecting the line occupied by the type when ejected, said revolving and advancing means including a type controlling device receiving the ejected type and holding the same against turning.

40. In a type-setting machine, the combination of ejectors, a part having a surface forming a type bed onto which the ejectors deliver type, said bed having an outlet, a high speed traveling means having a spring actuated movable pusher suspended over said surface, and traveling over said surface, and over said outlet at intervals of high frequency, a type barrier at said outlet to arrest the type, said suspended pusher traveling in a lowered position behind a type until the type reaches the barrier, and yielding to ride over the type and barrier.

41. In a type-setting machine adapted to use type provided with a transverse groove in its body, the groove constituting a keyway, a magazine, a fixed path-way circumjacent to said magazine, means for ejecting the type upon said path-way, an annular member adapted to continuously travel over said path and having a depending rib thereon the rib constituting a key, and means for raising the annular member bodily during the ejection of said type thereby permitting the key to enter the groove in the type.

42. In a type-setting machine, in combination with a type supply magazine for type having a key-way across its body, a stationary annular surface constituting a fixed path-way upon which a type may be ejected, means for ejecting type from said magazine upon said surface, a constantly traveling key adapted to move over said surface and means for inserting said traveling key into the key-way in the type thereby locking the type against longitudinal displacement.

43. In a type-setting machine, the combination of a bed, the surface of which forms an arcuate path for the type, a series of ejectors for delivering type to said surface, means for advancing and guiding type on said surface, said means comprising a ring traveler having type-guiding and type-propelling means, driving means for said ring traveler, a lifting device for raising the traveler, a bank of keys corresponding with the ejectors, levers operated by said keys, operative connections between the levers and the ejectors, a universal bar acted upon by the levers in common, and operative connections between the universal bar and the lifting device of the ring traveler.

44. In a type-setting machine, the combination of a bed the surface of which forms an arcuate path for type, a series of ejectors for delivering type to the said surface, means for advancing and guiding type on said surface, said means comprising a ring traveler having type-guiding and type-propelling means, driving means for said ring traveler, key operated levers, means for actuating the ejectors by the movement of the said levers and means acted upon by said levers for lifting the ring traveler to receive an ejected type.

45. In a type-setting machine, the combination of a bed forming on its surface a path for type, a series of ejectors delivering type to said path, a revolving type-guiding device traveling over said path, a revolving type advancing member traveling over said path, a lifting device for the said guiding device, a series of key operated levers, means for actuating the ejectors by the movement of said levers, and means acted upon by said levers for actuating the mentioned lifting device.

46. In a type-setting machine provided with a magazine and a key-board, a rotating universal type keying means, means for ejecting a type, said type being provided with a groove laterally across its body to receive keying means and means operative through the depression of a key-board key for raising the universal type key simultaneously with the ejection of a type and without arresting its rotary movement.

47. In a type-setting machine, a magazine, means for ejecting grooved type therefrom, said means being operative through key-lever connections, a constantly revolving type locking rib, type advancing means, means combined with said key-lever connection for simultaneously raising the locking rib out of the path of the advancing type and other means whereby the said locking rib descends into the groove in the type irrespective of the key-lever manipulation.

48. In a type-setting machine having a magazine and a stationary flat surface upon which type may be ejected, the type having a level lower surface and a transverse groove formed intermediate of its length upon its upper surface, a type keying means, said means corresponding with the groove in the type whereby longitudinal movement of the type is prevented and traveling type advancing means arranged at intervals in said key whereby the type is moved laterally upon said flat surface and under the type keying means.

49. In a type-setting machine having a plurality of type channels each adapted to contain a vertical line of type of the same character, means for ejecting the lowermost type horizontally outward in a radial line from any selected channel to a uniform distance, a stationary bed upon which the type may be ejected, said bed having a type-receiving opening therethrough, a rotating ring traveling over said bed, a key formed on the lower surface of said ring, said key being adapted to engage with the type at the limit of their ejection and means combined with said ring for conveying ejected type to the opening, said means being also adapted to propel the type therethrough.

50. In a type-setting machine having a magazine and a stationary flat surface upon which type may be ejected, means for moving ejected type radially, means for maintaining ejected type at a fixed radial distance, means for positively moving the type circumferentially of the magazine and means for discharging type vertically downward through said surface.

51. In a type-setting machine comprising a magazine, a stationary annular track-way therearound and a finger-board having levers and other operative means combined therewith for ejecting selected type upon the track-way, the combination with a rotating type-key, means for elevating said key by depressing any finger board lever, coincident with type ejection and means permitting the lowering of said key independent of the finger-board levers.

52. In a type-setting machine comprising a magazine, a stationary track-way surrounding the magazine at the base thereof and a finger-board having selective levers and other operative means combined therewith for ejecting type, the combination with a constantly rotating endless type-key traveling over said track-way, means for raising said type-key through the depression of any one of the selective levers and means permitting the lowering of said type-key irrespective of the further action of the selective lever.

53. In a type-setting machine comprising a magazine, a stationary track-way surrounding the magazine at the base thereof and a finger-board having selective levers and other operative means combined therewith for ejecting type, the combination with a constantly rotating endless type-key traveling over said track-way, means for raising said type-key through the depression of any one of the selective levers and means permitting the lowering of said type-key, said means being operative before the return movement of the selective lever.

54. In a type-setting machine comprising a magazine, a stationary track-way surrounding the magazine at the base thereof, and a finger-board having selective levers and other operative means combined therewith for ejecting type, the combination with a constantly rotating endless type-key traveling over said track-way, means for raising said type-key, and means permitting the return of the same to its normal position during the depression of any selective lever.

55. In a type-setting machine, a surface constituting a path onto which type may be ejected longitudinally, the type having key-ways across their body on the upper side thereof, a traveling key adapted to travel over the path, means for ejecting a type onto the path, means for raising the traveling key during the forward movement of the type onto the path and means permitting the insertion of said traveling key into the key-way in the type.

56. A typesetting maching comprising an upright series of magazine type channels, a chase comprising a series of upright type channels and a movable mounting for the chase, in combination with means for ejecting and transferring selected type from the magazine to the chase channels including a gravity chute or throat leading to the upper ends of the chase channels and a step-feed device for the chase adapted to register successive channels therein with the gravity chute.

57. A machine for setting type comprising in combination a type magazine, a chase, a throat in type-delivering relation to the chase, key operated means for ejecting type from the magazine for transfer to the throat and chase, and a continuously advancing member having alining engagement with the ejected type and operating to move the same to said throat for delivery therethrough to the chase.

58. A typesetting machine comprising a type magazine, a chase, a throat in type-delivering relation to the chase, and key operated means for ejecting type from the magazine for transfer to the throat, in combination with means, coöperating with the ejector means, for transferring ejected type to the throat and constructed to receive such type only in a determinate relation and to retain it in such relation during the whole of the transfer operation, the said throat having a cross-sectional contour adapted to accommodate the type in same relation in which it is received by the said transferring means and adapted to prevent turning of the type relatively thereto.

59. A typesetting machine comprising a magazine of type, a chase, a delivery throat and key-operated mechanism for ejecting the magazine type for transfer to the throat, in combination with the transfer means consisting of a traveling member having one or more yielding type-moving elements thereon which yield from the type on arrival at the throat.

60. A typesetting machine comprising a magazine of type, a chase, a throat in delivering relation to the chase, and means for ejecting magazine type for transfer to the throat, in combination with yielding and type alining, transfer mechanism for moving ejected type to the throat.

61. A typesetting machine comprising a magazine of type, a chase, a throat in type delivering relation to the chase and means for ejecting type from the magazine for transfer to the throat, in combination with transfer means comprising a traveling member carrying one or more type pushers projecting into engagement with the type and adapted to relinquish engagement therewith at the entrance of the throat.

62. A typesetting machine comprising a magazine of type channels, a throat having its type-receiving entrance parallel with such channels, a chase or typeholder, and means for transferring the type from the magazine into said throat and adapted to keep the same side of the type uppermost throughout the whole of said transfer movement, and the said throat serving to confine the type against relative turning movement therein while moving to the chase.

63. A typesetting machine comprising a series of type supply channels and a race on which type ejected therefrom are moved substantially parallel with the plane of their upper and lower faces, a throat receiving such type and conducting the same in a direction parallel with the other faces of said type and a chase to which the type are delivered by the throat.

64. In a typesetting machine, the combination with a magazine of type channels having ejectors and a throat, of intermediate type-transfer mechanism comprising a closed race and automatic means for opening the race to receive the type ejected thereinto.

65. In a typesetting machine, the combination with the magazine channels and ejectors, of a closed type-confining race, means correlated with the ejectors for opening the race to receive the ejected type, means for moving the type through the race and a throat having a cross-sectional contour which conforms to and engages the faces of the type which were perpendicular to the race.

66. In a typesetting machine, a magazine of type channels, having type ejecting means and a type race, the latter including a type-confining and alining member, means whereby such member is automatically displaced relatively to the ejected type to accommodate movement of said type into the control of such member, a throat for conducting the type from the race to the place of composition.

67. In a typesetting machine, the combination with a series of magazine channels containing grooved type, of a type-race comprising a key or rib, ejector mechanism operating to deposit the selected type with the said grooves thereof engaged with said key or rib, a throat, and means for advancing said type thereto in the relative position established by such rib and groove engagement.

68. In a typesetting machine, the combination with a series of type magazine channels, and a type race having alining engagement with the type ejected into it and formed in part by a revolving type-transferring member, of ejector mechanism coördinated with said transferring member to delay engagement of the ejected type therewith until the ejecting movement of said type has been completed, thereby insuring transfer of the type in the same relative position in which it was ejected from the magazine, and a throat arranged to receive such type in the said relative position.

69. In a typesetting machine, the combination with a series of type channels, a type race, throat and chase, of ejector mechanism coöperating with the channels and provided with engaging means formed to engage the type on more than one face, whereby the type is guided against displacement during the ejecting movement and means for advancing the type in the same relative position through the race and into the said throat.

70. A typesetting machine comprising a stationary magazine and a chase or type-holder both formed with type channels adapted to interlock with side-grooved types adapted to slide therein and rotary transferring means also interlocking with the same type and operating to transfer the same from the magazine to the chase whereby the types are confined in determinate position during transfer from magazine to chase.

71. In a typesetting machine, the combination with a magazine of type channels, having ejector mechanism, a type-race provided with a moving transferring member having a yielding, driving engagement with the type ejected into the race, a discharge throat for said race intersecting the same substantially at right angles thereto and adapted to engage only those faces of the type which were perpendicular to the race during the transfer movement, and to conduct such type parallel with such faces.

72. In a typesetting machine, a type-race having a transferring member in driving engagement with the type in said race, a discharge throat intersecting the race at substantially a right angle thereto and adapted to form a slideway engaging only those faces of the type which were perpendicular to the race during transfer, in combination with means engaged with the type on arrival at the throat and directing force against it in the direction to start it in motion through said throat.

73. In a typesetting machine, a type-race having means for moving type through it, a barrier fixedly mounted in said race and adapted to stop the type and a throat through which the stopped type moves to the place of composition.

74. A typesetting machine adapted for setting type grooved on three sides, comprising a magazine engaging opposite grooves thereof, a type race having means engaging the intermediate groove, a chase and means for moving the type through the type-race to the chase.

75. A typesetting machine adapted for setting type grooved on three sides, comprising a magazine and chase having channels engaging grooves in the opposite sides, a type-race having a rib engaging the groove in the intermediate side and means whereby the type are moved from the magazine, through the race and into the chase.

76. A typesetting machine adapted for setting type grooved on three sides, comprising a magazine having upright stationary channels engaging the said grooves, a chase having channels engaging the same grooves, a type-race and transfer means therefor operating in a plane transverse to such grooves and a throat through which the type are discharged in a direction parallel with the said grooves therein.

77. A typesetting machine adapted for setting type grooved on three sides, comprising a magazine for containing such type, a type-race, and means for advancing the type through the race comprising a pusher member having contact with the type within the said groove or recess therein.

78. A typesetting machine comprising a stationary magazine provided with ejectors, a circular type-race including a rotary, ring-form transferring member having yielding, pushing engagement with the type ejected into said race, a delivery throat for the race and a chase receiving the type therefrom.

79. A typesetting machine comprising an upright cylindrical series of stationary type channels, a flat chase comprising a series of upright type channels and a movable mounting for the chase, in combination with means for ejecting and transferring selected type from the magazine to the chase channels including a gravity chute or throat leading to the upper ends of the chase channels and a step-feed device for the chase adapted to register successive channels therein with the gravity chute.

80. A machine for setting type comprising in combination a stationary type magazine, a movable chase, a fixed throat in type-delivering relation to the chase, means for ejecting type from the magazine for transfer to the throat and chase, and a ring-form member having positive alining engagement with the ejected type and operating to move the same to said throat for delivery therethrough to the chase.

81. A typesetting machine comprising an upright magazine of type channels, a chase, a throat in type-delivering relation to the chase, and key operated means for ejecting type from the magazine for transfer to the throat, in combination with a rotary, ring-form member coöperating with the ejector means, for transferring ejected type to the throat and constructed to receive such type only in a determinate relation and to lock it in such relation during the transfer operation, the said throat having a cross-sectional contour adapted to engage the same sides of the type that were engaged by the magazine channels and adapted to prevent turning of the type relatively thereto.

82. A typesetting machine comprising a circular magazine of type, a chase, a delivery throat and key-operated mechanism for ejecting the magazine type for transfer to the throat, in combination with the transfer means consisting of a power-driven ring-form member having one or more yielding type-moving elements thereon which yield from the type on arrival at the throat.

83. A typesetting machine comprising a circular upright magazine of type, a flat chase, a throat in type delivering relation to the chase and adapted to guide the type in a direction parallel with the printing face thereof, and means for ejecting type from the magazine for transfer to the throat, in combination with transfer means comprising a power-driven ring carrying one or more type pushers projecting into engagement with the type and adapted to relinquish engagement therewith at the entrance of the throat.

84. A typesetting machine comprising a circular, upright magazine of type channels adapted to engage the grooves of side-grooved type, a throat having its type-receiving entrance parallel with such channels and adapted also to engage the grooves in said type, a chase or type-holder, and means for transferring the type from the magazine into said throat and adapted to keep the same side of the type uppermost throughout the whole of said transfer movement, and the said throat serving to confine the type against relative turning movement therein while moving to the chase.

85. A typesetting machine comprising a circular series of type supply channels and a circular race into which type ejected therefrom are moved substantially parallel with the plane of their upper and lower faces, a throat receiving such type and shaped to fit the upright faces of said type to prevent relative turning movement thereof while within the throat and a chase to which the type are delivered by the throat.

86. In a typesetting machine, the combination with a circular magazine of type channels having ejectors, and a throat, of intermediate type-transfer mechanism comprising a closed circular race and automatic means for opening the race to receive the type ejected thereinto.

87. In a typesetting machine, a circular magazine of channels for grooved type, type ejecting means and a circular type race, the latter including a type-confining and alining rib member, means whereby such rib is temporarily displaced relatively to the ejected type to permit engagement thereof with the groove in said type, and a discharge throat which leads the said type away from engagement with said rib.

88. A typesetting machine comprising an upright stationary cylindrical magazine and a flat chase or type-holder both formed with type channels adapted to interlock with side-grooved types which are adapted to slide in said channels, rotary power-driven transferring means also interlocking with the same type and operating to transfer the same from the magazine to the chase whereby all the types are positively confined in a determinate position during transfer from magazine to chase.

89. A machine for setting side-grooved type comprising in combination with the type-race, transfer means, throat and chase-holder, a magazine of upright type channels formed to interlock slidably with the grooves of said type and extension channels of like formation adapted for removable connection to said magazine channels.

In witness whereof I have hereunto signed my name this 24 day of May, 1911, in the presence of two subscribing witnesses.

WALTER WRIGHT.

Witnesses:
  Wm. H. Gee,
  M. Conrad.